United States Patent [19]

Ryan

[11] Patent Number: 4,856,915
[45] Date of Patent: Aug. 15, 1989

[54] SUBMERSIBLE BEARING AND HUB ASSEMBLY

[76] Inventor: Barry F. Ryan, 69 Doonside Road, Blacktown, Australia, 2148

[21] Appl. No.: 149,030

[22] Filed: Jan. 27, 1988

[30] Foreign Application Priority Data

Apr. 14, 1987 [AU] Australia .................................. PI1474
Jul. 20, 1987 [AU] Australia .................................. PI3205
Jan. 12, 1988 [AU] Australia .................................. PH9827

[51] Int. Cl.[4] .................................................. F16C 19/00
[52] U.S. Cl. ................................. 384/473; 384/375
[58] Field of Search ............... 384/473, 375, 289, 290, 384/373, 374, 377

[56] References Cited

U.S. PATENT DOCUMENTS

| 300,197 | 6/1884 | Bery | 384/375 |
| 503,902 | 8/1893 | Chamberlain | 384/290 |
| 2,337,403 | 12/1943 | Myers et al. | 384/473 |

Primary Examiner—Lenard A. Footland
Attorney, Agent, or Firm—Beveridge, DeGrandi & Weilacher

[57] ABSTRACT

A vehicle wheel hub assembly which protects the bearings located therein from deterioration resulting from water penetrating the interior of the hub. The assembly has a hub housing, the interior of which communicates with a reservoir located above the housing and which contains liquid lubricant. The communication between the hub housing and reservoir allows filling of the hub interior with lubricant when stationary or rotating at low speed and escape of lubricant into the reservoir from the hub housing when the hub is in rapid motion.

7 Claims, 5 Drawing Sheets

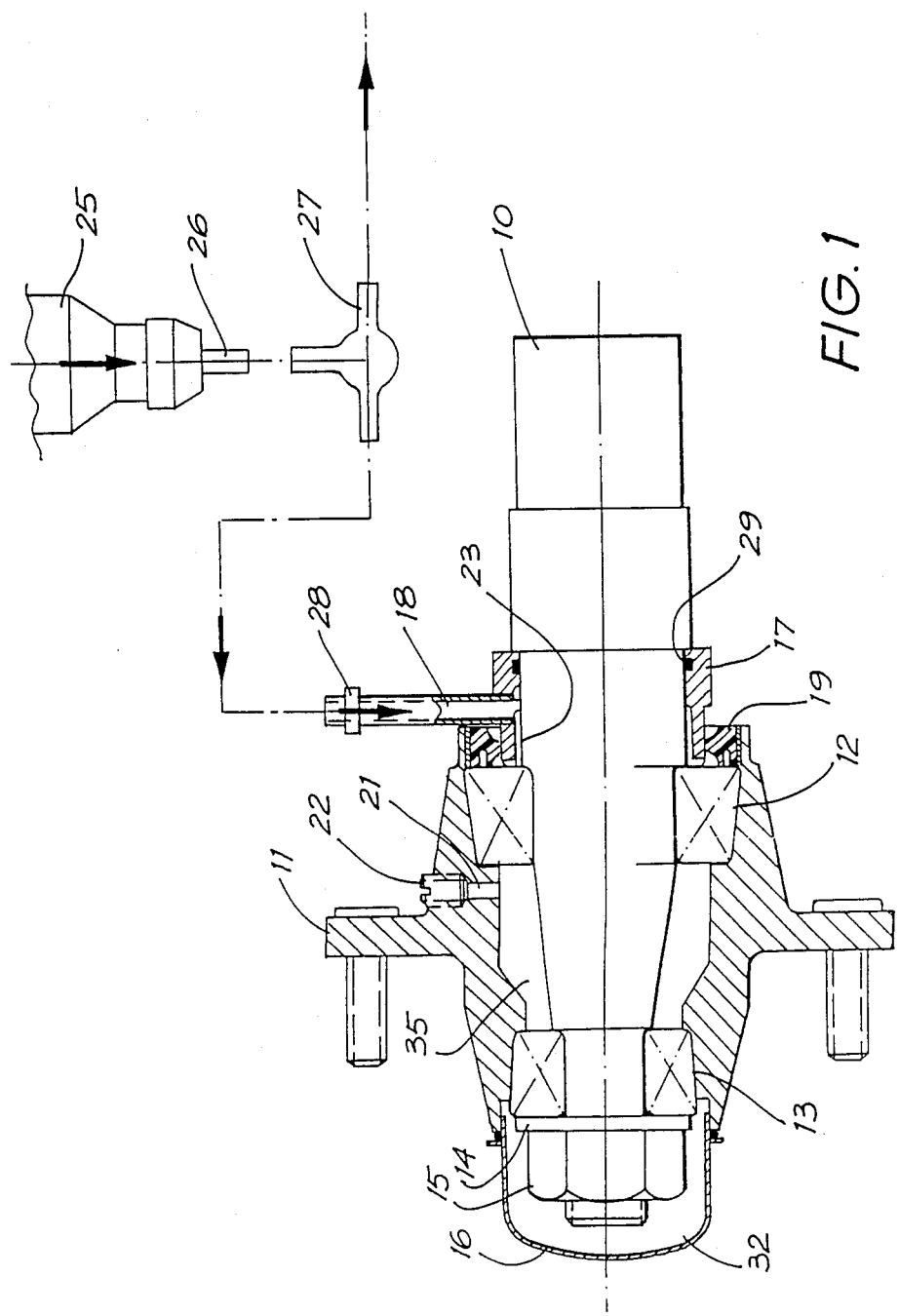

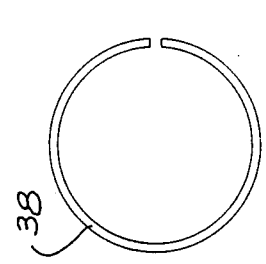
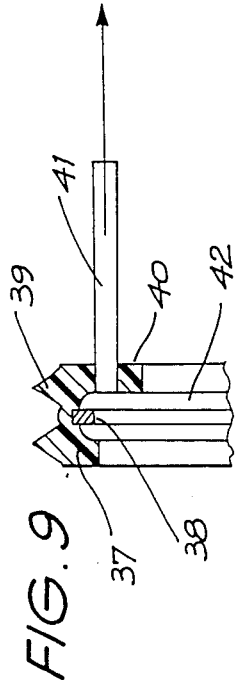
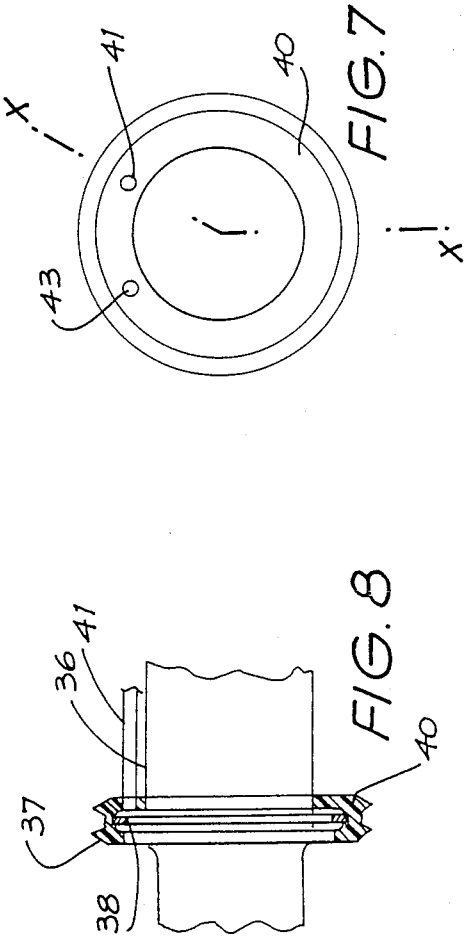
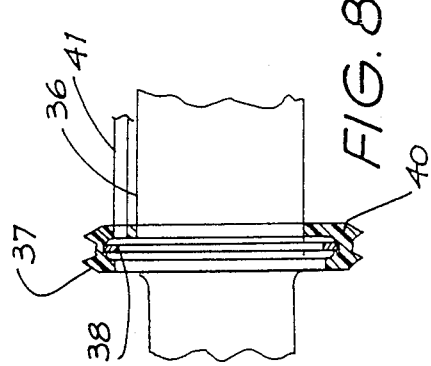

SUBMERSIBLE BEARING AND HUB ASSEMBLY

FIELD OF INVENTION

This invention relates to the protection from deterioration of bearings resulting from water penetrating the interior of vehicle hubs in which such bearings are housed.

BACKGROUND OF THE INVENTION

A feature of the wheel hub assemblies presently in use is that whenever the wheel hub of a vehicle is under the level of water, as is common for boat trailers submerging to launch or retrieve a vessel or a caravan subjected to flooded crossings, water enters the hub housing and penetrates to the bearings located therein. The water enters because it exerts a higher external pressure on the sealing lip of the hub seal than the gas pressure resident within the hub itself, so distorting the lip of the seal and allowing water to enter the hub. As a result, the lubricant within the hub becomes contaminated with water which spreads to the bearings and causes oxidation and rapid deterioration of the wearing surfaces of the bearing assemblies.

OBJECT AND SUMMARY OF THE INVENTION

It is an object of the present invention to prevent water entering wheel hub housings, thereby maintaining the lubricant in a substantially uncontaminated condition and protecting the bearings from water mediated deterioration.

It has now been found that filling the interior of the hub housing with liquid lubricant will stop penetration of water through the sealing lip of the hub seal when the hub is submerged in water. The present invention resides in a means for automatically filling a hub housing with liquid lubricant when the hub is stationary or rotating at low speed.

Accordingly, the present invention resides in a submersible wheel bearing assembly which is not subject to penetration by water when submerged in water and rotating at low speed.

According to the invention there is provided a submersible wheel bearing assembly comprising a wheel hub housing, a liquid lubricant reservoir positioned above said housing and port means communicating with the interior of said housing and with said reservoir.

In a preferred form of the invention there is provided a submersible wheel bearing assembly comprising:
 a wheel hub housing,
 a liquid lubricant reservoir positioned above said housing,
 a tube connecting said reservoir to an oil relief port associated with said housing,
 said port communicating with the interior of the hub housing to allow filling of the interior with lubricant when stationary or rotating at low speed and escape of lubricant into the reservoir from the hub housing when said hub is in rapid motion.

The communication between the lubricant reservoir and the interior of the hub housing may be achieved by a variety of port means.

In one embodiment, there is provided a submersible wheel bearing assembly comprising a wheel hub housing, a liquid lubricant reservoir positioned above said housing, a sleeve means surrounding an axle inwardly of said housing, means defining a liquid lubricant passageway between said sleeve and the interior of said housing, and port means communicating with said passageway and with said reservoir.

Preferably the sleeve means comprises two parts of different internal diameter, being
 a smaller internal diameter part adapted to fit against the shoulder of the axle and be sealed thereto by an O-ring seal positioned along the inner circumference of the said smaller part,
 a large internal diameter part adapted to fit within the seal of the hub housing and contact against the inner cylinder of the bearing, said contacting surface adapted to allow passage of lubricant from the sleeve interior to the roller bearings and the hub interior, and
 an oil relief port extending across the wall of the sleeve and emerging at the inner surface of the said larger part to provide communication between the interior and exterior of the sleeve, which oil relief port engages a tube feeding from a lubricant reservoir.

In a further embodiment, there is provided a submersible wheel bearing assembly comprising a wheel hub housing, a liquid lubricant reservoir positioned above said housing, an inner spring seal surrounding an axle and sealing with said housing, and port means communicating with the interior of said housing and with said reservoir, said port comprising a passageway through said inner spring seal.

Preferably the inner spring seal comprises:
 a circular expanding spring;
 a sealing lip tensioned upon the outer circumference of the said spring; and which consists of:
  an outer lip adapted to be fitted within the seal of the hub housing, and,
  an inner flange adapted to secure the spring seal to the surface of the axle, which flange when so secured provides a cavity within the spring seal that communicates with the roller bearings and the hub interior, and
  an oil relief port extending across the wall of the flange to communicate between the interior cavity of the spring seal and the exterior, which oil relief port engages a tube feeding from a lubricant reservoir.

In a further embodiment, communication may be achieved by a galley or series of galleys passing through the axle and which extend to the interior of the hub housing and which receive lubricant from the lubricant reservoir by an oil relief port which either may extend from and be continuous with the opening of the galley on the axle surface, or may be a part of an oil transfer sleeve when in its functional position.

BRIEF DESCRIPTION OF THE DRAWINGS

Particular embodiments of the present invention will now be described with reference to the accompanying drawings in which:

FIG. 1 is a longitudinal section of the assembled axle and hub housing incorporating the sleeve means schematically connected to the lubricant reservoir, FIG. 7 is a view toward the oil relief port of the inner spring seal, FIG. 8 is a sectional side view through XX of the inner spring seal of FIG. 7, FIG. 9 is a sectional side view through XX of the upper part of the inner spring seal of FIG. 7, and, FIG. 10 is a plan view of the circular expanding spring used in the inner spring seal of FIG. 7.

DETAILED DESCRIPTION

Figure 3:
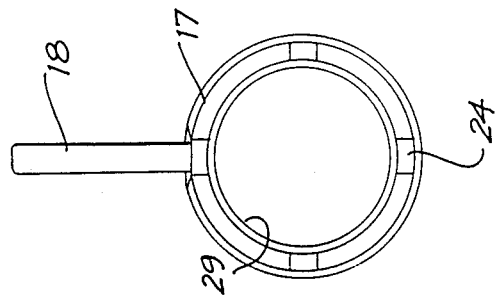
FIG. 3 is a view toward the smaller external diameter part of the sleeve means which is used in the assembly of FIG. 1.
Figure 2:
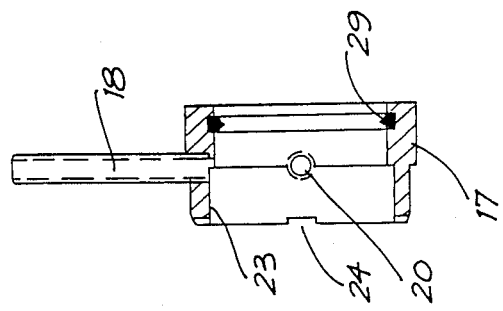
FIG. 2 is a sectional side view of the sleeve means which is used in the assembly of FIG. 1.
Figure 4:
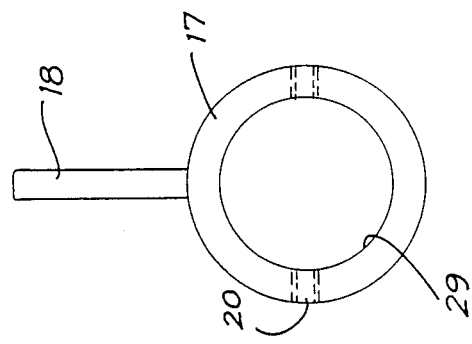
FIG. 4 is a view toward the larger external diameter part of the sleeve means, with dotted lines representing the securing holes within the walls of the sleeve.

The following is a description of a preferred embodiment which uses the sleeve means of FIG. 2 as the means of communication between the lubricant reservoir and the hub interior, and is described in conjunction with FIGS. 1, 2, 3, and 4.

A trailer axle 10 supports a hub 11 on roller bearings 12 and 13. The hub is maintained in position by thrust washer 14 and adjusting nut 15. A cap 16 encloses the outer end of the hub 11. A sleeve means 17 with oil relief port 18 is fitted within the hub seal 19 and is pressed against the shoulder of the axle 10 to enclose the interior of the hub housing. The sleeve means is secured to the axle 10 by one or more tightening screws (not shown) through securing holes 20. The oil relief port 18 should be at its uppermost position. The roller bearings 12 and 13 allow the hub 11 freely to rotate about the axis of the axle 10.

Liquid lubricant may be introduced into the hub interior by a variety of means. Preferably, however, during installation of the apparatus of the present invention, the lubricant is introduced through the oil relief port 18 and displaced air allowed to escape from the interior through a hole 21 drilled through the hub housing. Normally the hole 21 is closed by plug 22. The lubricant introduced through oil relief port 18 passes through recess 23 and oil flow grooves 24 to the roller bearings 12 and hub interior. The plug 22 is then reinserted to seal the lubricant within the hub interior.

An empty storage reservoir 25 is then positioned above the level of the hub interior and a hollow tube 26 feeds from the reservoir 25 to a T-junction 27 where the tube divides into two. Each tube feeds into the oil relief port 18 on its respective hub housing. Each tube is secured to the oil relief port by a clip 28 to complete the communication of the storage reservoir with the hub interior.

When the assembly of FIG. 1 filled with lubricant is functioning, centrifugal force and the cavitation effect of the bearings 12 and 13 propels lubricant to the oil relief port 18 and then into the tubing 26, which acts as a reservoir. If required, lubricant may enter but not fill the reservoir 25. Enough lubricant remains in the hub interior during operation to ensure proper functioning and protection of wearing surfaces. As the rate of rotation of the hub decreases, liquid lubricant falls under gravity and returns to the hub interior. The O-ring seal 29 ensures that the lubricant does not escape from the hub interior, but is directed along recess 23. When stationary, the hub interior is filled with lubricant.

When the hub housing is submerged in water, the lubricant-filled interior will oppose penetration of water through the hub seal 19 by applying a counter pressure, supplied by the head of lubricant in the tubing 26 above the hub, from within on the lip of the hub seal 19.

Figure 5:
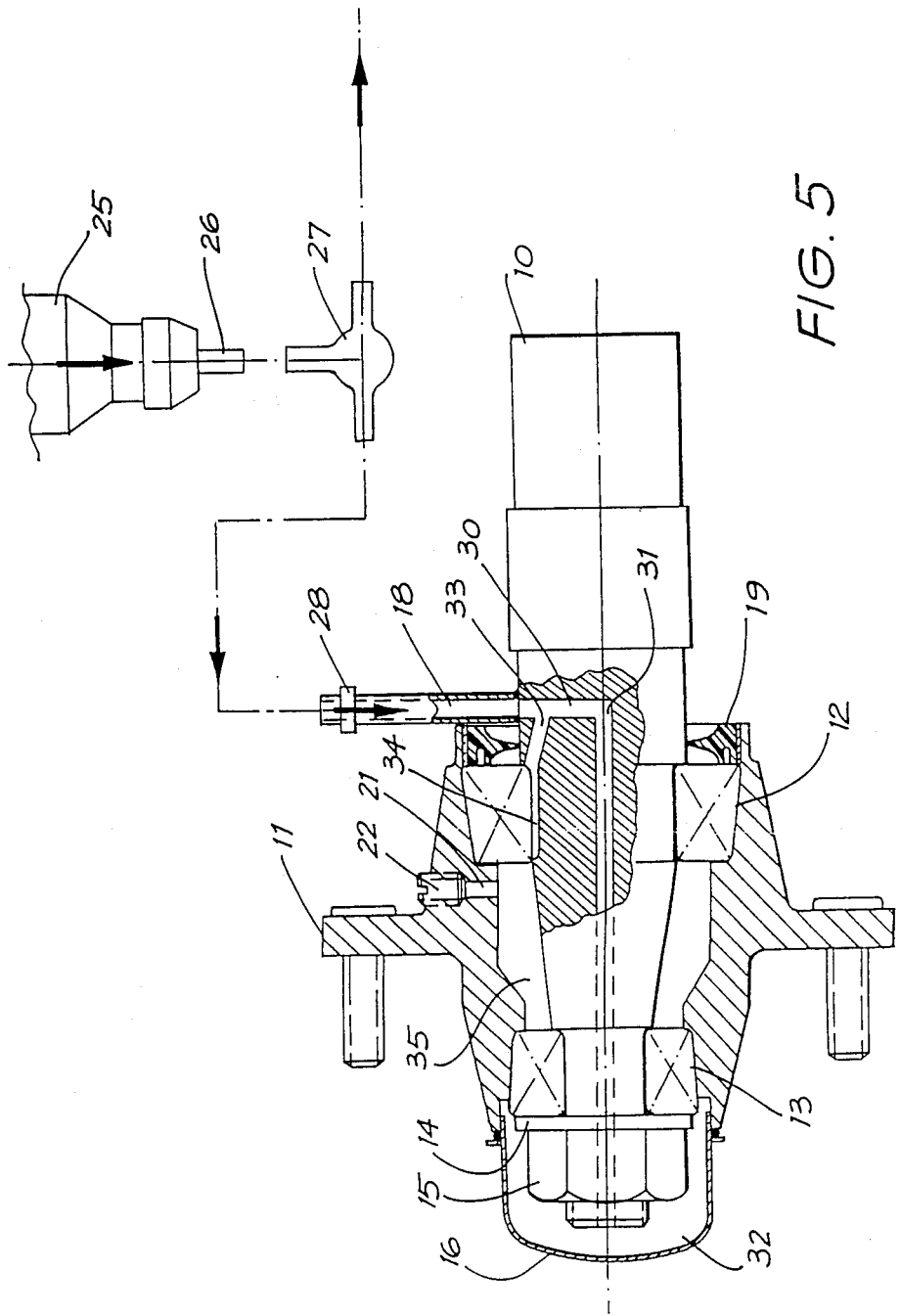
FIG. 5 is a longitudinal section of the assembled axle and hub housing incorporating the axle galleys and continuous oil relief outlet.
Figure 6:
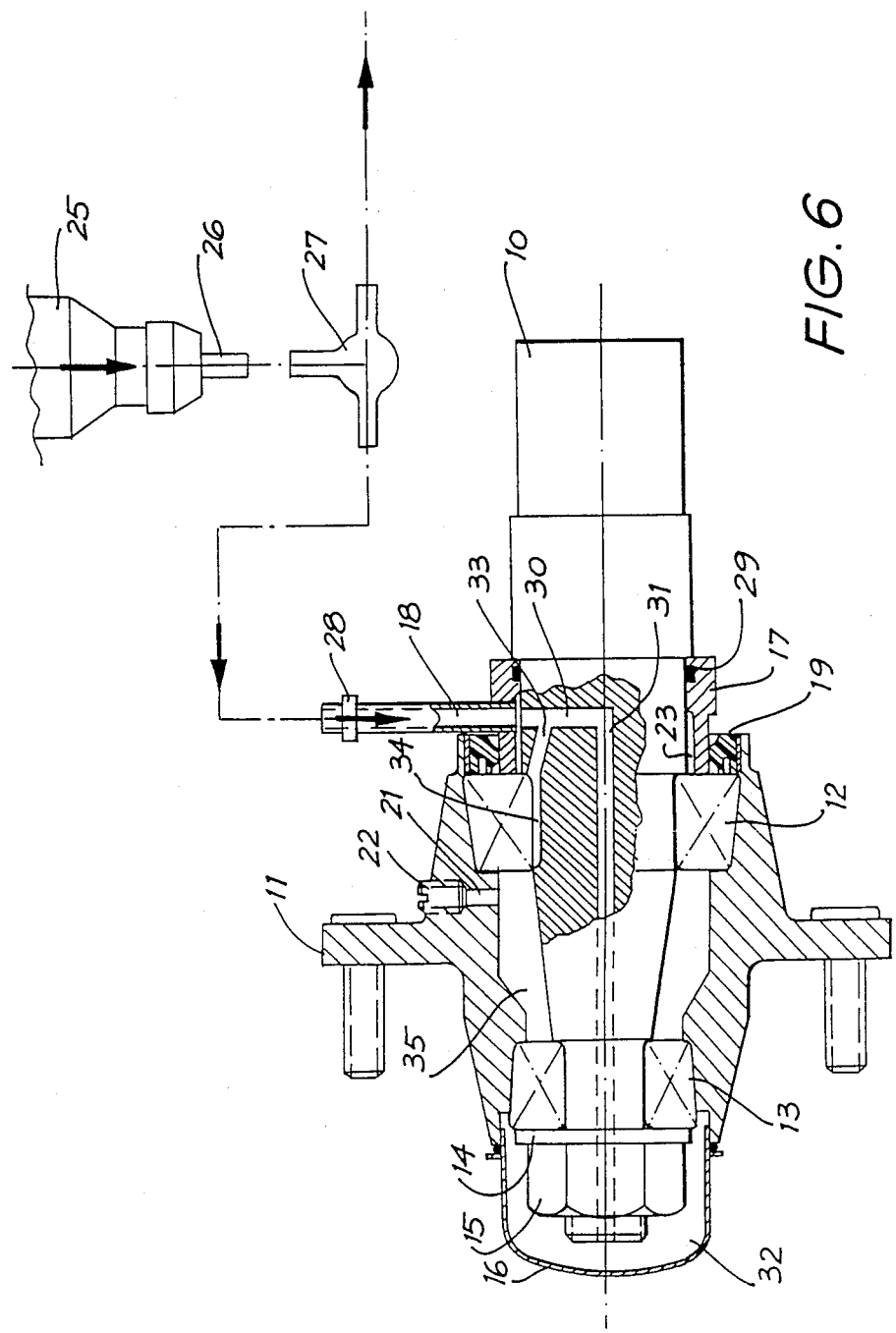
FIG. 6 is a longitudinal section of the assembled axle and hub housing incorporating the sleeve means of FIG. 2 and the axle galleys.

The following is a description of an embodiment which makes use of oil transfer galleys drilled through the axle as shown in FIG. 5 as a means of communication between the reservoir 25 and the hub interior. The modified axle of Fig. 5 may be used in conjunction with the sleeve means of Figs. 2, 3 and 4, (as shown in FIG. 6), or with any sleeve that has an oil relief port but lacks the recess 23, or with an oil relief port that is continuous with the axle and extends from the opening of the galley (when a sleeve is absent).

The oil relief port 18, is continuous with the oil transfer galley 30 drilled perpendicularly to the axis of the axle 10. The galley 30 connects to another galley 31 drilled along the central longitudinal axis of the axle, and which emerges behind the cap 16, thus providing a communication between the reservoir 25 and the outer cavity 32 of the hub housing. The galley 30 also connects with another galley 33 drilled so as to pass under the shoulder of the axle upon which the sleeve means or, when such a sleeve is absent, the hub seal sits. The galley 33 emerges at the surface of the axle upon which the roller bearing 12 sits via a gutter 34. The lubricant can therefore freely displace under the inside surface of the roller bearing 12 and so communicate between the tubing 26 and the inner cavity 35 of the hub housing, by the effect of the centrifugal force generated by the rotation of the hub when the hub assembly is in motion, and by gravity when the hub assembly is stationary or at low speed.

The following is a description of an embodiment which uses the inner spring seal of FIG. 8 as the means of communication between the lubricant reservoir and the hub interior, and is described in conjunction with FIGS. 1, 7, 8, 9 and 10. The inner spring seal may replace the sleeve means which is part of the assembly of FIG. 1.

The inner spring seal sits against the wall of the inner cylinder of roller bearing 12 on axle shoulder 36. The inner spring seal consists of a sealing lip 37 which, when in operation, presses against the hub seal 19 by tension applied by the circular expanding spring 38. The sealing lip consists of an outer lip 39 and an inner flange 40, which flange provides a tight contact between the inner spring seal and the axle shoulder 36. The oil relief port 41 extends across the wall of the flange 40 to communicate between the interior cavity 42 of the inner spring seal and the exterior. An air bleed tube 43 also extends across the wall of the flange 40 to allow for the purging of air during lubricant filling of the hub interior. The inner spring seal with oil relief port 41 therefore allows displacement of the lubricant between the tubing 26 and the inner cavity 35 of the hub housing as described.

It is now apparent that applying any one of the various embodiments of the present invention to conventional hub and axle assemblies will substantially overcome the above-mentioned problems hitherto encountered when such assemblies are submerged in water. The filling of the hub interior with lubricant to provide sufficient outward pressure to overcome the pressure of the water on the hub seal may be achieved by the above means or any other means which allows the free passage of lubricant between the interior of the hub and reservoir means as hereinbefore discussed.

Various modifications may be made in details of design and construction without departing from the scope and ambit of the invention.

What is claimed is:

1. A submersible wheel bearing assembly comprising:
 a wheel hub housing,
 a liquid lubricant reservoir positioned above said housing,
 a tube connecting said reservoir to an oil relief port means associated with said housing, said port means communicating with the interior of the hub housing for filling of the interior with lubricant when said hub housing is stationary or rotating at low speed, said port means being operable to provide the escape of lubricant into the reservoir from the hub housing when said hub housing is in rapid motion.

2. An assembly according to claim 1 further comprising sleeve means surrounding an axle inwardly of said housing, means defining a liquid lubricant passageway between said sleeve and the interior of said housing, said port means communicating with said passageway.

3. An assembly according to claim 2 wherein the sleeve means comprises two parts of different internal diameter, being:
 a smaller internal diameter part adapted to fit against the shoulder of the axle and be sealed thereto by an O-ring seal positioned along the inner circumference of the said smaller part,
 a larger internal diameter part adapted to fit within the seal of the hub housing and contact against the inner cylinder of the bearing, said contacting surface adapted to allow passage of lubricant from the sleeve interior to the roller bearings and the hub interior, and
 an oil relief port extending across the wall of the sleeve and emerging at the inner surface of the said larger part to provide communication between the interior and exterior of the sleeve, which oil relief port engages a tube feeding from a lubricant reservoir.

4. An assembly according to claim 1 further comprising an inner spring seal surrounding an axle and sealing with said housing, said port comprising a passage through said inner spring seal.

5. An assembly according to claim 4, wherein said inner spring seal comprises:
 a circular expanding spring;
 a sealing lip tensioned upon the outer circumference of the said spring; and which comprises:
  an outer lip adapted to be fitted within the seal of the hub housing, and,
  an inner flange adapted to secure the spring seal to the surface of the axle, which flange when so secured provides a cavity within the spring seal that communicates with the roller bearings and the hub interior, and
  an oil relief port extending across the wall of the flange to communicate between the interior cavity of the spring seal and the exterior, which oil relief port engages a tube feeding from a lubricant reservoir.

6. An assembly according to claim 1 wherein said reservoir comprises a liquid lubricant tube connected to said port.

7. An assembly according to claim 6 wherein said tube is connected with a substantially fluid-tight container.

* * * * *